UNITED STATES PATENT OFFICE.

GEORGE W. TOLHURST, OF LIVERPOOL, OHIO.

COMPOSITION FOR MAKING SOAP.

Specification forming part of Letters Patent No. 26,306, dated November 29, 1859.

*To all whom it may concern:*

Be it known that I, GEORGE W. TOLHURST, of Liverpool, in the county of Medina and State of Ohio, have invented a new and useful Improvement in Soap Compounds; and I do hereby declare that the following is a full and exact description thereof, reference being had to the accompanying ingredients and to the letters of reference marked thereon.

Package A is a piece of common rosin bar-soap. Package B is a piece of sal-soda. Package C is borax. Package D is linseed-oil. Package E is common burned sugar. Package F contains soft soap made from the above ingredients. Package G is a piece of hard soap made from the above ingredients.

To enable others skilled in the art to make and use my invention, I will proceed to describe my mode of compounding this soap, also the proportion of each ingredient contained in my compound soap.

For making hard soap, as shown in package G, I hang a kettle over a fire, in which I put one gallon of soft water. As soon as the water boils I put into the water a quarter-ounce of burned sugar. (Shown in package E.) I then put in two pounds of common rosin bar-soap, as shown in package A, to which I add twelve ounces of sal-soda, as shown in package B. I then add six ounces of borax, as shown in package C. As soon as the above are melted, put in one table-spoonful of linseed-oil from package D, stir the whole well, and it is ready for use as soon as it is cold. Package G contains a piece of soap compounded as above.

My soft soap, as shown in package F, is made in the same way and of the same ingredients, but of different proportions of chemicals to the same amount of water, as follows, namely: one gallon of soft water, four ounces of common rosin bar-soap, (marked A,) two ounces of sal-soda, (marked B,) quarter of an ounce of borax, (marked C,) half-dram of sugar, burned, (marked E,) and a tea-spoonful of linseed-oil, (marked D.) Package F contains a specimen of soft soap made in the above-mentioned way.

Having described my improved compound soap, I do not wish it understood that I wish to claim any of the aforesaid ingredients separate, or any one of them combined with bar-soap; but

What I claim as new, and desire to secure by Letters Patent, is—

A soap compound when prepared of the ingredients proportioned in the quantities hereinafter mentioned, viz: five ounces common bar-soap, four ounces sal-soda, half-ounce borax, half-dram of sugar, burned, and one tea-spoonful of linseed-oil. Add as much rain-water as to make a soap of suitable consistency. After it is boiled it is ready for use.

GEORGE W. TOLHURST.

Witnesses:
WM. C. BIDLE,
WESLEY A. HOWART.